US011306464B2

(12) United States Patent
Holbrook

(10) Patent No.: US 11,306,464 B2
(45) Date of Patent: Apr. 19, 2022

(54) WATER STORAGE SYSTEMS

(71) Applicant: Living Water Storage Solutions LLC, Farmington, UT (US)

(72) Inventor: Ben W. Holbrook, Pine Valley, UT (US)

(73) Assignee: Living Water Storage Solutions LLC, Farmington, UT (US)

( * ) Notice: Subject to any disclaimer, the term of this patent is extended or adjusted under 35 U.S.C. 154(b) by 101 days.

(21) Appl. No.: 16/842,403

(22) Filed: Apr. 7, 2020

(65) Prior Publication Data

US 2020/0232195 A1 Jul. 23, 2020

Related U.S. Application Data

(63) Continuation-in-part of application No. 15/896,300, filed on Feb. 14, 2018, now Pat. No. 10,612,215.

(51) Int. Cl.
*E03B 11/02* (2006.01)
*C02F 1/32* (2006.01)

(52) U.S. Cl.
CPC .............. *E03B 11/02* (2013.01); *C02F 1/32* (2013.01)

(58) Field of Classification Search
CPC ..... Y10T 137/86187; Y10T 137/86196; Y10T 137/86204; Y10T 137/8622; Y10T 137/8158; E03B 11/06
See application file for complete search history.

(56) References Cited

U.S. PATENT DOCUMENTS

| | | | | |
|---|---|---|---|---|
| 1,531,808 A ‡ | 3/1925 | Parkinson | ............... | E03C 1/044 210/181 |
| 3,081,603 A * | 3/1963 | Schmanke, Jr. | .......... | F28F 9/00 62/77 |
| 4,663,089 A ‡ | 5/1987 | Lowry | ............... | B01D 19/0005 210/221.2 |
| 4,962,789 A ‡ | 10/1990 | Benscoter | ............... | E03B 11/02 137/357 |
| 5,046,529 A ‡ | 9/1991 | Corella | ................... | E03B 11/06 137/590.5 |
| 5,248,417 A ‡ | 9/1993 | Reid | .................... | B01D 24/007 210/195.1 |
| 6,378,546 B1 * | 4/2002 | Hansen | .................. | E03B 11/06 137/208 |
| 6,398,965 B1 * | 6/2002 | Arba | ........................ | C02F 1/42 210/257.2 |
| 7,631,658 B2 * | 12/2009 | Graeve, Jr. | ............... | B28C 7/12 137/558 |
| 9,631,859 B2 ‡ | 4/2017 | Park | ...................... | F25D 23/126 |
| 2013/0334256 A1‡ | 12/2013 | Pioli | ...................... | B65D 25/42 222/185.1 |
| 2014/0345721 A1‡ | 11/2014 | Keisel | ....................... | E03B 5/02 137/565.17 |

(Continued)

*Primary Examiner* — Umashankar Venkatesan
(74) *Attorney, Agent, or Firm* — Kirton McConkie; Brian Tucker

(57) ABSTRACT

Water storage systems are provided to facilitate storing water for use when a primary source of water becomes unavailable. These water storage systems can be configured to connect into a home's or a building's plumbing to enable the water tanks of the system to be easily filled and regenerated. The water storage systems may include a support system to maximize space utilization and to possibly provide seismic protection.

20 Claims, 9 Drawing Sheets

(56) References Cited

U.S. PATENT DOCUMENTS

2016/0060850 A1\* 3/2016 Johnson ................. E03B 11/06
                                                                                 137/12
2019/0010681 A1‡ 1/2019 Shi ........................... E03B 7/04

\* cited by examiner
‡ imported from a related application

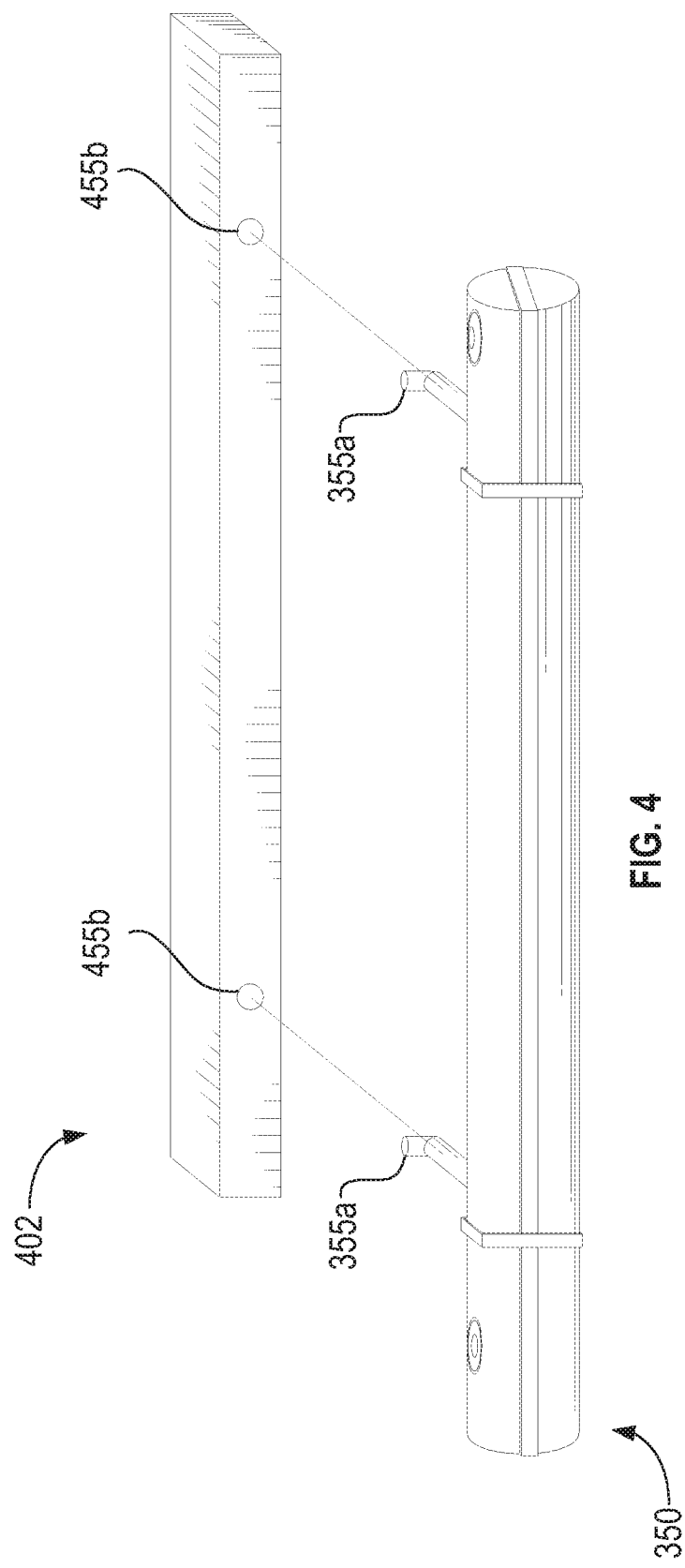

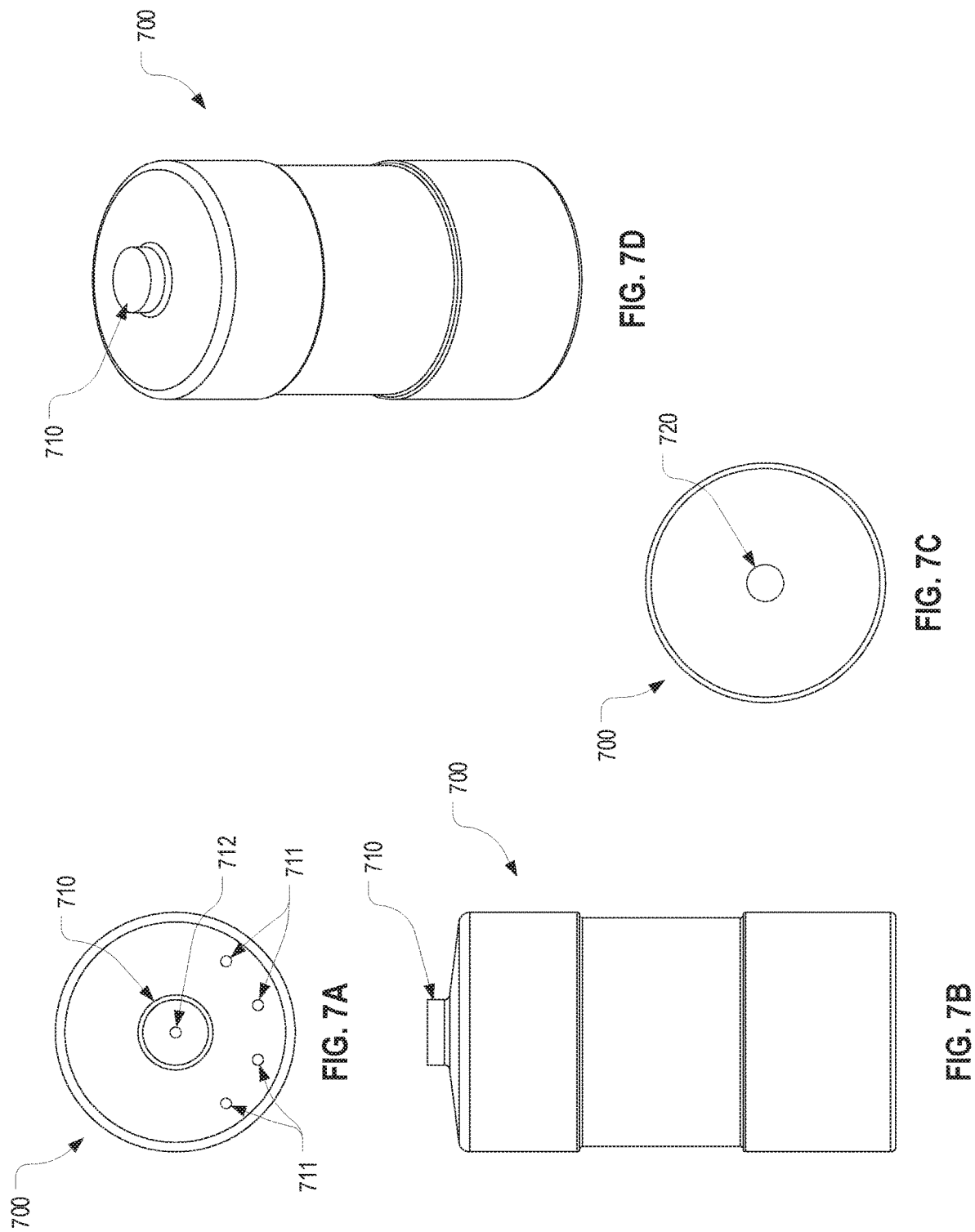

WATER STORAGE SYSTEMS

CROSS-REFERENCE TO RELATED APPLICATIONS

This application is a continuation-in-part of U.S. patent application Ser. No. 15/896,300 which was filed on Feb. 14, 2018.

BACKGROUND

Various reasons exist for storing water. For example, in case of a natural disaster, the local water supply may be disrupted for an extended period of time. Even if the water supply is not disrupted, it may become polluted or contaminated. To avoid being without water during such scenarios, people oftentimes use storage tanks to store water. For example, it is common for homeowners to store water in the garage or a basement storage room in 55 gallon (or other size) water barrels. When there is limited space available, individuals may use a number of small containers, ranging from dedicated water containers to milk jugs, to store water.

Regardless of how water is stored, various problems arise. For example, the storage tanks or containers occupy a relatively large amount of space. Oftentimes, individuals do not have adequate space or are unwilling to dedicate adequate space to support themselves for any meaningful amount of time. Also, even if individuals store water, it may become unusable before it is needed. If water is untreated, it may become unpotable within six months. Even if it is initially treated, it will likely require subsequent treatments (e.g., every 5 years if treated with a chlorine-based preserver). Additionally, once filled, storage tanks may be too heavy to move which may discourage individuals from using them. Further, even if water has been stored and is safe to consume in the event of an emergency, many individuals fail to acquire components (e.g., a pump) for extracting the water from the storage tank. This lack of the necessary components combined possibly with the weight of the tank may make it difficult or impossible to access the water. In the face of all these difficulties, many simply choose not to store water.

BRIEF SUMMARY

The present invention extends to water storage systems that facilitate storing water for use when a primary source of water becomes unavailable. These water storage systems can be configured to connect into a home's or a building's plumbing to enable the water tanks of the system to be easily filled and refreshed. The water storage systems may include a support system to maximize space utilization and to possibly provide seismic protection.

In one embodiment, the present invention is implemented as a water storage system for use with water storage tanks. The water storage system includes: an inlet for connecting a first tank to a water source, the inlet including an upper interface component by which the inlet couples to the first tank and a flow control component for enabling water to flow from the water source into the first tank; an upper inter-tank connection for interconnecting the first tank with a second tank, the upper inter-tank connection including an upper interface component for each tank and one or more fittings or pipes for connecting the upper interface components together; a lower inter-tank connection for interconnecting the first tank with the second tank, the lower inter-tank connection including a lower interface component for each tank and one or more fittings or pipes for connecting the lower interface components; and an outlet that is configured to couple to the lower inter-tank connection, the outlet including a flow control component for enabling the water to flow out from the first and second tanks.

In another embodiment, the present invention is implemented as a water storage system that includes a support and one or more water storage pods. Each pod includes a support structure that houses a tank and that is configured to mount to the support. Each tank includes multiple ports each of which is configured to function as an inlet or an outlet for the flow of water.

In another embodiment, the present invention is implemented as a water storage system comprising: an inlet for connecting a first tank to a building's plumbing, the inlet including an upper interface component by which the inlet couples to the first tank and a flow control component for enabling water to flow from the plumbing into the first tank; an upper inter-tank connection for interconnecting the first tank with a second tank, the upper inter-tank connection including an upper interface component for each tank and one or more fittings or pipes for connecting the upper interface components together; a lower inter-tank connection for interconnecting the first tank with the second tank, the lower inter-tank connection including a lower interface component for each tank and one or more fittings or pipes for connecting the lower interface components; an outlet that is configured to couple to the lower inter-tank connection, the outlet including a flow control component for enabling the water to flow out from the first and second tanks; and a venting component that is configured to vent air from within the upper inter-tank connection.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates another embodiment of a water storage system that includes a support for mounting a water tank;

FIGS. 7A, 7B, 7C and 7D are a top, front, bottom and perspective view respectively of another water tank that may be used in embodiments of the present invention.

DETAILED DESCRIPTION

Water storage systems in accordance with embodiments of the present invention provide a modular and customizable solution to an individual's, group's, business's or organization's water storage needs. The water storage systems can be employed to quickly and easily adapt existing water storage tanks into a water storage system that integrates with plumbing. In some embodiments, the water storage systems can include a support for mounting water tanks in a space-optimizing manner. Accordingly, the water storage systems of the present invention facilitate storing water in a manner that will ensure that the water will be usable in an emergency situation and without occupying excessive space.

Figure 1:
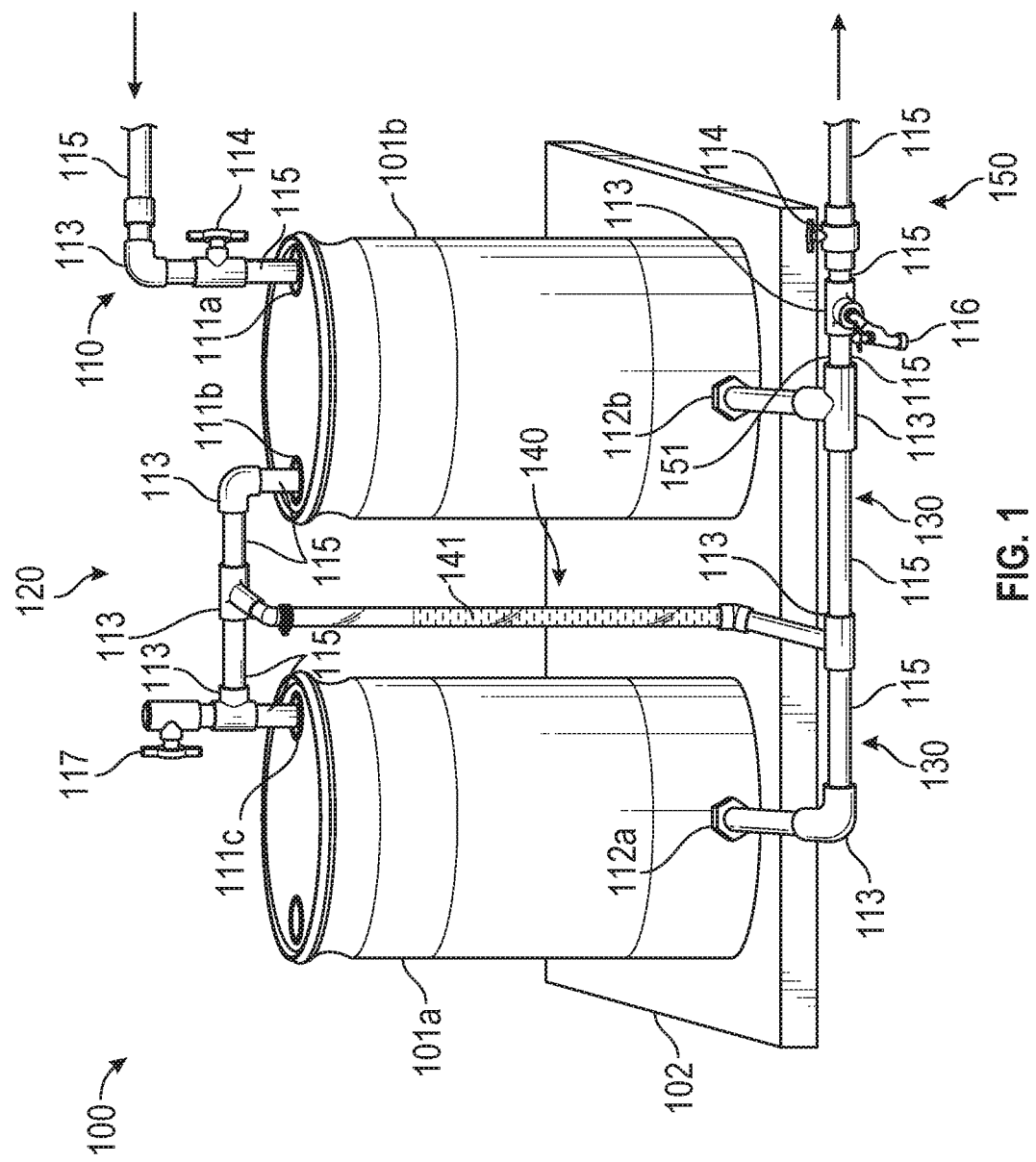
FIGS. 1 and 2 each illustrate an embodiment of a water storage system that includes a platform for supporting the water tanks.

FIG. 1 illustrates a water storage system 100 in accordance with embodiments of the present invention. Water storage system 100 can be used in any building, structure, portable container, or trailer whether for home or commercial use. Water storage system 100 includes tanks 101a, 101b that are supported on a raised platform 102. Although two tanks are shown, water storage system 100 may include any number of tanks. In such cases, multiple platforms 102 may be used in a side-by-side fashion if necessary to accommodate the additional tanks. Tanks 101a, 101b may typically be 55 gallon plastic drums that are commonly used in a standalone fashion to store water. However, any tank could be used.

Water storage system 100 includes a number of components that are used to interconnect each tank (e.g., tanks 101a and 101b) and to enable the interconnected tanks to be connected into a building's plumbing. These components include upper interface components 111, lower interface components 112, fittings 113, flow control components 114, pipes 115, dispensing component(s) 116, and venting component(s) 117.

Upper interface component 111 may be configured as a threaded cap that can replace the existing caps in a 55 gallon drum or other tank with similar caps. However, in other embodiments, upper interface component 111 may be configured to couple to and insert through the existing caps. In further embodiments, upper interface component 111 may couple to the top wall or side wall of the tank rather than through a cap. As an example, upper interface component 111 can be a bulkhead fitting that includes a first component that is positioned inside the tank (or cap) and a second component that is positioned outside the tank (or cap) but secured to the first component. In any case, upper interface component 111 provides an interface external to the tank for connecting the tank either to another tank or to a water source such as the building's plumbing. In some embodiments, upper interface component 111 may include quick-connect components.

Three upper interface components 111a-111c are shown in the example in FIG. 1. Upper interface components 111a-111c can be configured in the same manner to allow them to be interchangeable. Upper interface component 111a is shown as being connected through the cap of tank 111a (or may be integrated into a cap that replaces the existing cap of tank 111a) and to the plumbing to thereby form an inlet 110 for water to enter water storage system 100. A flow control component 114 is connected between upper interface component 111a and the plumbing, and functions to selectively allow or block the flow of water into water storage system 100. As an example, flow control component 114 can be a manual valve that the user can actuate to allow water to flow into the system or an automatic valve controlled by a control system.

In other embodiments, upper interface components 111 could be configured to couple to a tank through another opening (i.e., not through the caps that are commonly provided with such tanks). For example, a custom cap that is capable of integrating two upper interface components 111 could be provided and configured to couple to an opening in the top of a tank. In such cases, the user could select to integrate one or two upper interface components into the cap depending on where a particular tank will be situated relative to other tanks in the water storage system.

Upper interface component 111b is shown as being connected through the cap opposite upper interface component 111a while upper interface component 111c is shown as being connected through a cap on tank 101a. Various fittings 113 and pipes 115 can be employed to interconnect upper interface components 111b and 111c to thereby form an upper inter-tank connection 120. Although water storage system 100 is shown with two tanks 101a, 101b, system 100 may include one or more additional tanks that are interconnected using the same or similar upper inter-tank connection 120.

In the depicted embodiment, a venting component 117 is integrated into upper inter-tank connection 120 to enable air to vent from within tanks 101a, 101b. In embodiments of water storage system 100 that include more than two tanks, venting component 117 may be integrated into only one of the upper inter-tank connections 120 or may possibly be integrated into more than one or all of the upper inter-tank connections 120. Venting component 117 may be in the form of a manual or automatic valve that can be opened and closed to selectively vent air from the tanks, in the form of a one-way valve that only allows air to escape the tanks, or in another suitable form. Venting component 117 can be operated during both filling and draining of tanks 101a, 101b. For example, while the tanks are being filled, venting component 117 can be opened to allow air to escape the tanks, whereas, while the tanks are being emptied, venting component 117 can be opened to allow air to enter the tanks.

Each of tanks 101a, 101b also includes a lower interface component 112a, 112b respectively. Lower interface components 112a, 112b are coupled towards the bottom of the respective tank to thereby allow water to flow out of the tanks. In some embodiments, lower interface components 112a, 112b may be in the form of bulkhead fittings that can be integrated into the wall of existing water storage tanks. A number of fittings 113 and pipes 115 can be employed to interconnect lower interface components 112a, 112b to thereby form a lower inter-tank connection 130. In embodiments that include more than two tanks, a lower inter-tank connection 130 can be provided for each additional tank. In some embodiments, a flow control component 114 can coupled inline with lower interface component 112a and/or 112b to thereby function as an isolation valve to isolate the water of the respective tank 101a, 101b. Although system 100 may be configured for use with existing tanks, in some embodiments, tanks could be custom designed to incorporate upper interface components 111 and lower interface component 112.

When system 100 is being filled, lower inter-tank connection 130 will allow water that flows into tank 101b via inlet 110 to flow into tank 101a so that both tanks become filled. Also, during this filling process, upper inter-tank connection 120 and venting component 117 will ensure that the water level in each of tanks 101a, 101b remains substantially the same (i.e., venting component 117 will enable air to flow equally out from tanks 101a and 101b). In embodiments with more than two tanks, the upper and lower inter-tank connections 120/130 between each adjacent pair of tanks will equally ensure that all tanks fill to substantially the same level.

In some embodiments, system 100 may include a water level indicator 140 which can provide a visual indication of the water level within each tank. For example, in FIG. 1, system 100 includes a transparent pipe (or tube) 141 that is coupled between upper inter-tank connection 120 and lower inter-tank connection 130. Because pipe 141 is coupled between upper inter-tank connection 120 and lower inter-tank connection 130, the level of the water within pipe 141 will be substantially the same as the water level within each of tanks 101a, 101b. The transparency of pipe 141 will allow the user to quickly identify when system 100 has been filled to a desired level so that the user may close flow control component 114. In other embodiments, water level indicator 140 may include a sensor (e.g., a sensor coupled to or embedded within pipe 141 or possibly within either of tanks 101a, 101b) which can detect when the water level has reached a particular level and can automatically close flow control component 114.

System 100 may also include an outlet 150 by which water may exit tanks 101a, 101b. In the depicted embodiment, outlet 150 is in the form of various fittings 113 and pipes 115 that couple to lower inter-tank connection 130. Outlet 150 includes a flow control component 114 (which may be a manual or automatic valve) which may be actuated to selectively allow water to flow from system 100.

In some embodiments, outlet 150 may be coupled directly into a building's plumbing. For example, system 100 could be connected in parallel with the building's plumbing so that the water stored in system 100 could be refreshed by simply opening flow control components 114 of inlet 110 and outlet 150. In such cases, water flowing out of outlet 150 will be provided back to the plumbing so that the water will not be wasted. Alternatively, in other embodiments, outlet 150 could be connected to a drain for disposal of the water in the sewer or to a hose to use the water for irrigation or a graywater system.

In FIG. 1, outlet 150 includes a spigot (or hose bib) 116 which provides a way to selectively obtain water from system 100. For example, if water was no longer available via the building's plumbing (e.g., in case of a natural disaster), individuals would be able to obtain the water stored in tanks 101a, 101b via spigot 116. By placing tanks 101a, 101b on platform 102, spigot 116 will be sufficiently elevated to enable this access. In some embodiments, spigot 116 could be incorporated into lower inter-tank connection 130 rather than into outlet 150. Also, in some embodiments, lower inter-tank connection 130 may include isolation valves (not shown) to allow the water within a particular tank to be isolated from the water within another tank or tanks. Such isolation valves could be connected inline with the lower interface component 112 of the tank to be isolated.

Although not shown, embodiments of system 100 may include an automatic timer or other control system for periodically refreshing the water within tanks 101a, 101b. For example, a control system could be connected (e.g., via a wired or wireless connection) to flow control components 114 and venting component 117 and could be configured to periodically open these components to allow tanks 101a, 101b to be filled with fresh water. This may be particularly beneficial when inlet 110 and outlet 150 are connected in parallel with the building's plumbing since the stored water will not be wasted, but will rather be distributed through the plumbing for use within the building. In such cases, the control system could be configured to regenerate the stored water at relatively frequent intervals. In other embodiments, a control system may be configured to first open flow control component 114 of outlet 150 to thereby drain tanks 101a, 101b prior to opening flow control component 114 of inlet 110 to again fill tanks 101a, 101b.

As indicated above, system 100 may be provided for use with existing water storage tanks. For example, an individual may already be using tanks to store water in his or her garage or basement. In such cases, the individual may obtain system 100 in the form of platform 102, inlet 110, one or more upper inter-tank connections 120, one or more lower inter-tank connections 130, water level indicator 140 and outlet 150 and integrate these components into the existing tanks including possibly interconnecting the system with the existing plumbing.

Figure 2:
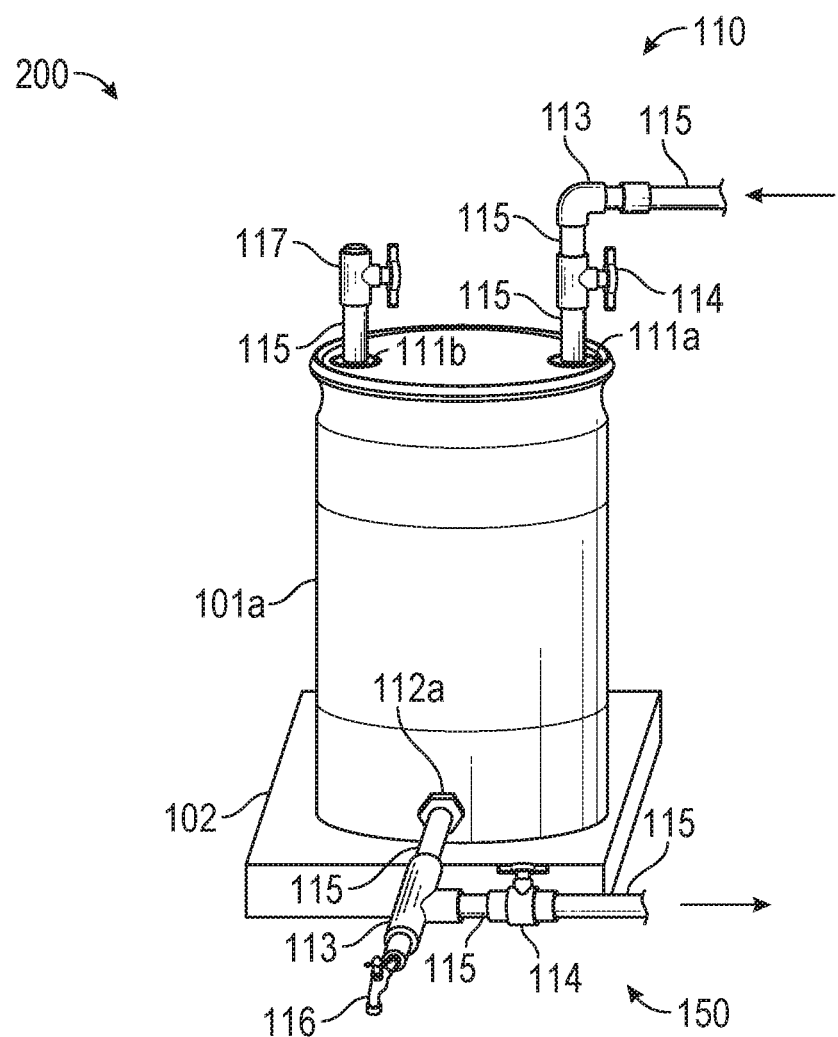

FIG. 2 provides an example of a water storage system 200 that includes a single tank 101a. System 200 is similar to system 100 but does not include upper inter-tank connection 120 or lower inter-tank connection 130. In such embodiments, venting component 117 can be coupled directly to upper interface component 111b. Although not shown, system 200 could include water level indicator 140 which could be connected between upper interface component 111b (or upper interface component 111a) and lower interface component 112a. As represented in FIG. 2, platform 102 could be sized to accommodate any particular number of tanks. Although not shown, platform 102 may also be configured with a number of spaced openings to allow the tanks to be tied down to the platform via ratcheting straps or another suitable mechanism to ensure that the tanks will not tip over during an earthquake.

Figure 3A:
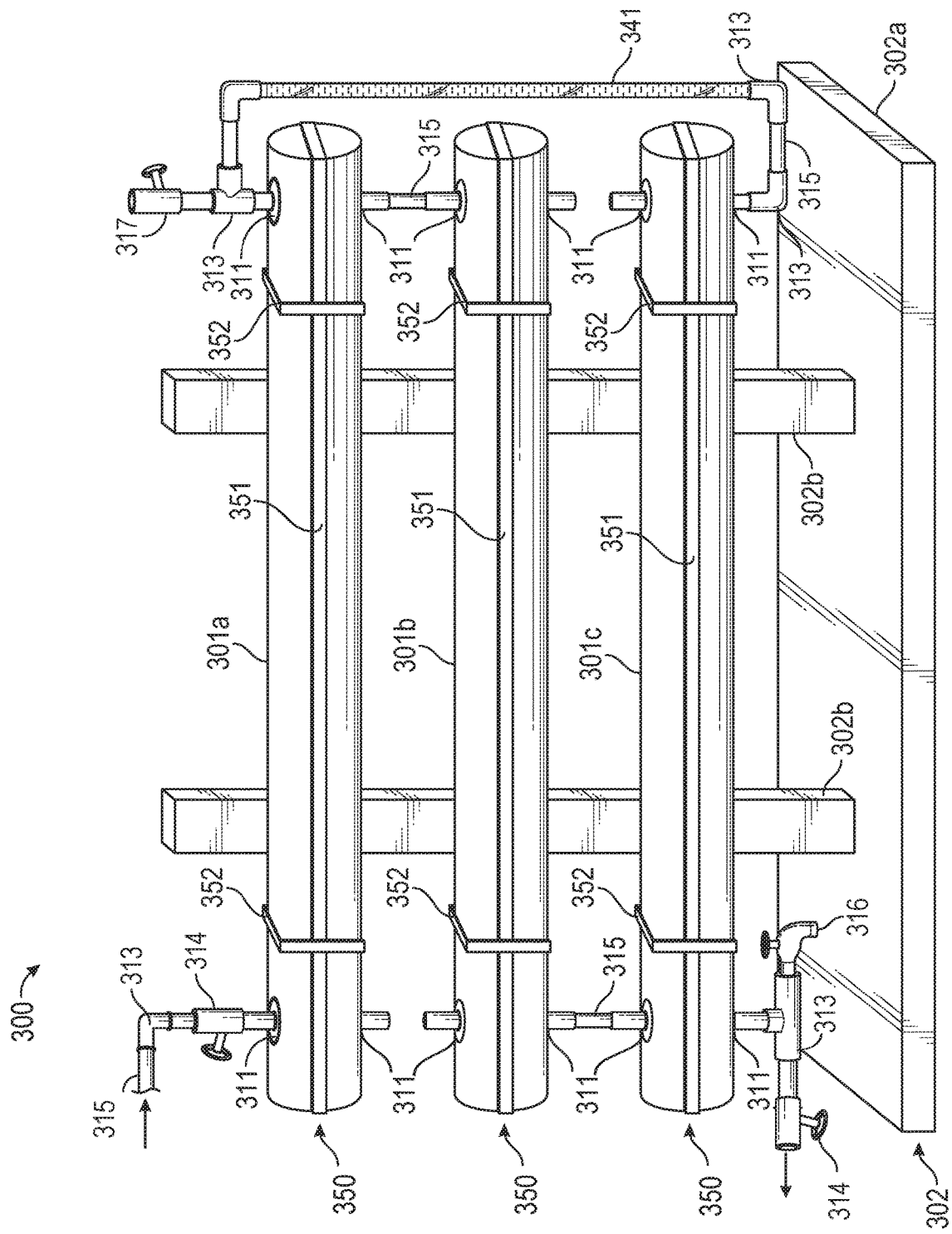
FIGS. 3A and 3B illustrate a front and side view respectively of an embodiment of a water storage system that includes a support for mounting the water tanks.
Figure 3B:
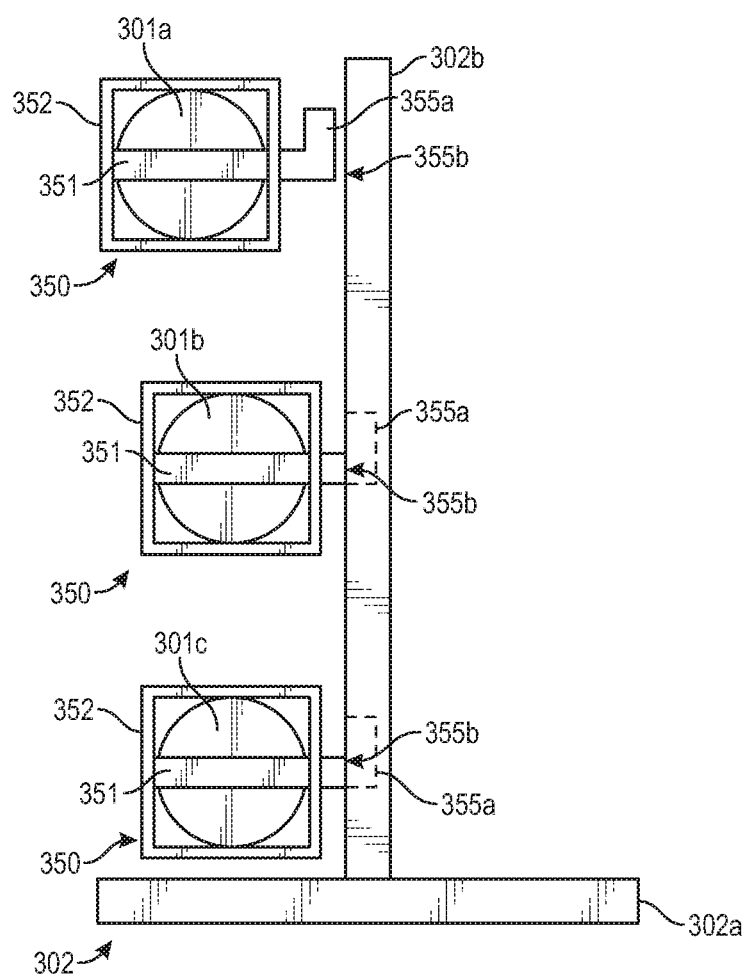

FIGS. 3A and 3B illustrate front and side views respectively of a water storage system 300 in accordance with other embodiments of the present invention. For simplicity, various components included in FIG. 3A are not shown in FIG. 3B. System 300 is similar to system 100 but is designed for more compact storage of water. In particular, system 300 includes one or more water storage pods 350 which are configured to couple to a support 302 in a compact, space-saving manner. Support 302 may include a base 302a and one or more posts 302b that extend from base 302a. Base 302a and posts 302b can be sized and shaped in various ways to fit a particular storage location. For example, in FIGS. 3A and 3B, base 302a and posts 302b are configured to enable pods 350 to be coupled on both sides of the posts. In other embodiments, the depth of base 302a may be reduced so that posts 302b may be positioned directly against (and possibly mounted to) a wall or other structure and so that pods 350 may be mounted only on one side. Because support 302 allows pods 350 to be stored in a vertical orientation, more water can be stored in a smaller footprint.

System 300 is shown as including three pods 350 each of which includes a water storage tank 301a, 301b, and 301c respectively (generally tanks 301). Each of tanks 301 can be formed as a cylindrical or other elongated shape and can include a pair of ports 311 at each end. Tanks 301 can be formed of pipe that meets potable water requirements or from other suitable plastics or polymers. The ports 311 in each pair can be on opposite sides of tank 301 such that one port 311 will be facing upward and one port will be facing downward on both ends of the tank. This configuration can allow tanks 301 to be interconnected in any orientation or configuration. In other embodiments, however, each tank 301 could be custom configured with ports 311 only where necessary for a particular installation.

Each pod 350 includes a support structure that may be formed from a horizontally-oriented support structure 351 and one or more interconnected vertically-oriented support structures 352. In the depicted embodiment, horizontally-oriented support structure 351 wraps around the length of tank 301 while two vertically-oriented support structure 352 wrap around the circumference of tank 301 at opposing ends. Horizontally-oriented support structures 351 can prevent tank 301 from sliding horizontally with respect to base 302a while vertically-oriented support structures 352 can support the weight of tank 301 while also preventing tank 301 from moving vertically with respect to base 302a. The support structure can therefore ensure that pods 350 will remain mounted to support 302 during an earthquake.

As shown in FIG. 3B, the support structure of pods 350 can include one or more securing structures 355a which allow the pod to be removably coupled to posts 302b. In the depicted embodiment, securing structures 355a are shown as upwardly oriented hooks that insert through corresponding openings 355b in posts 302b. However, securing structures 355a and posts 302b could be configured in other ways to allow pods 350 to be removably coupled to posts 302b.

Because pods 350 are removably coupled to posts 302b, they can be removed and transported if necessary. For example, in case of an emergency that requires fleeing the building for a duration of time, one or more of pods 350 could be removed and transported as a source of water. As will be further described below, pods 350 can include quick-connect interfaces to facilitate decoupling the pods from system 300 without spilling the water. The configuration and positioning of vertically-oriented support structures 352 can facilitate carrying pods 350. For example, a pod 350 could include two vertically-oriented support structures 352 that are spaced closely enough to allow a single individual to grasp both structures to lift and remove the pod from posts 302b. Alternatively, two individuals could grasp horizontally-oriented support structures 351 and/or vertically-oriented support structures 352 at opposing ends of the pod.

As mentioned above, each tank 301 can include a pair of ports 311 on each end, each of which can provide an inlet or outlet to the tank. In some embodiments, ports 311 can incorporate quick-connect/disconnect interfaces (e.g., push-to-connect interfaces) to allow two tanks 301 to be quickly interconnected using a pipe 315 or other suitable conduit. For example, in FIG. 3A, system 300 has been designed such that water from the plumbing flows into the port 311 at the top left end of tank 301a. Tanks 301a and 301b are interconnected at the right end and tank 301b and 301c are interconnected at the left end such that the three tanks are connected in series. The bottom left port 311 of tank 301c is connected back to the plumbing or to a drain to form an outlet for system 300. A spigot 316 may be integrated into this outlet to provide access to the water stored in system 300. In some embodiments, a transparent pipe 341 may be interconnected between a port 311 of tank 301c and a port 311 of tank 301a to provide a water level indicator. A venting component 317 may also be connected to a port 311 of tank 301a to allow air to vent from within tanks 301.

In some embodiments, system 300 may be connected in series with one or more plumbing fixtures within a building (e.g., a sink). In such embodiments, flow control components 314 may be left open to allow water to continuously flow through system 300 when the plumbing fixtures are used. This can ensure that the water within system 300 will always be fresh and will not require manual refreshing. In such cases, venting component 317 and pipe 341 may not be necessary. In other embodiments, however, system 300 may be connected in parallel with the plumbing to allow the water within system 300 to be selectively refreshed by opening flow control components 314 at a desired time. As with system 100, system 300 can include a control system for automatically controlling the functioning of the various components.

FIG. 4 illustrates that different configurations of supports can be employed with pods 350. In this figure, a support 402 that is designed for mounting a single pod 350 is shown. Support 402 is in the form of an elongated beam that could be mounted to the wall, in the floor joists, or in any other location of a building. Support 402 includes openings 455b that are configured to receive securing structures 355a such that pod 350 is removably mounted to support 402. In some embodiments, securing structures 355a can be configured as quick-connect components so that pod 350 can be quickly removed from support 402. For simplicity, pod 350 is shown in isolation without any interconnects. However, similar interconnections as employed in system 300 could be used to interconnect multiple pods 350 that are mounted to the same or separate supports 402. For example, supports 402 could be mounted to a number of adjacent floor joists so that multiple pods 350 could be mounted between the joists. Similarly, supports 402 could be mounted around a room on the walls. Regardless of how the supports and pods are arranged, pods 350 can be interconnected in series in a similar fashion as shown in FIG. 3A or be one continuous POD utilizing full size elbows at the change of direction. In this way, water can be easily stored and accessed in locations where it was not previously possible.

In any of the above described embodiments, a number of additional features could be employed including: a pressure relief valve to prevent over-pressurization of the tanks, pressure gauges at various locations to monitor pressure within the system, a backflow preventer to ensure that water from the tanks will not flow back into a building's plumbing, one or more filters or other water cleaning devices such as UV lights, water temperature gauges, circulation pumps, and drinking fountain connections among others.

Figure 5:
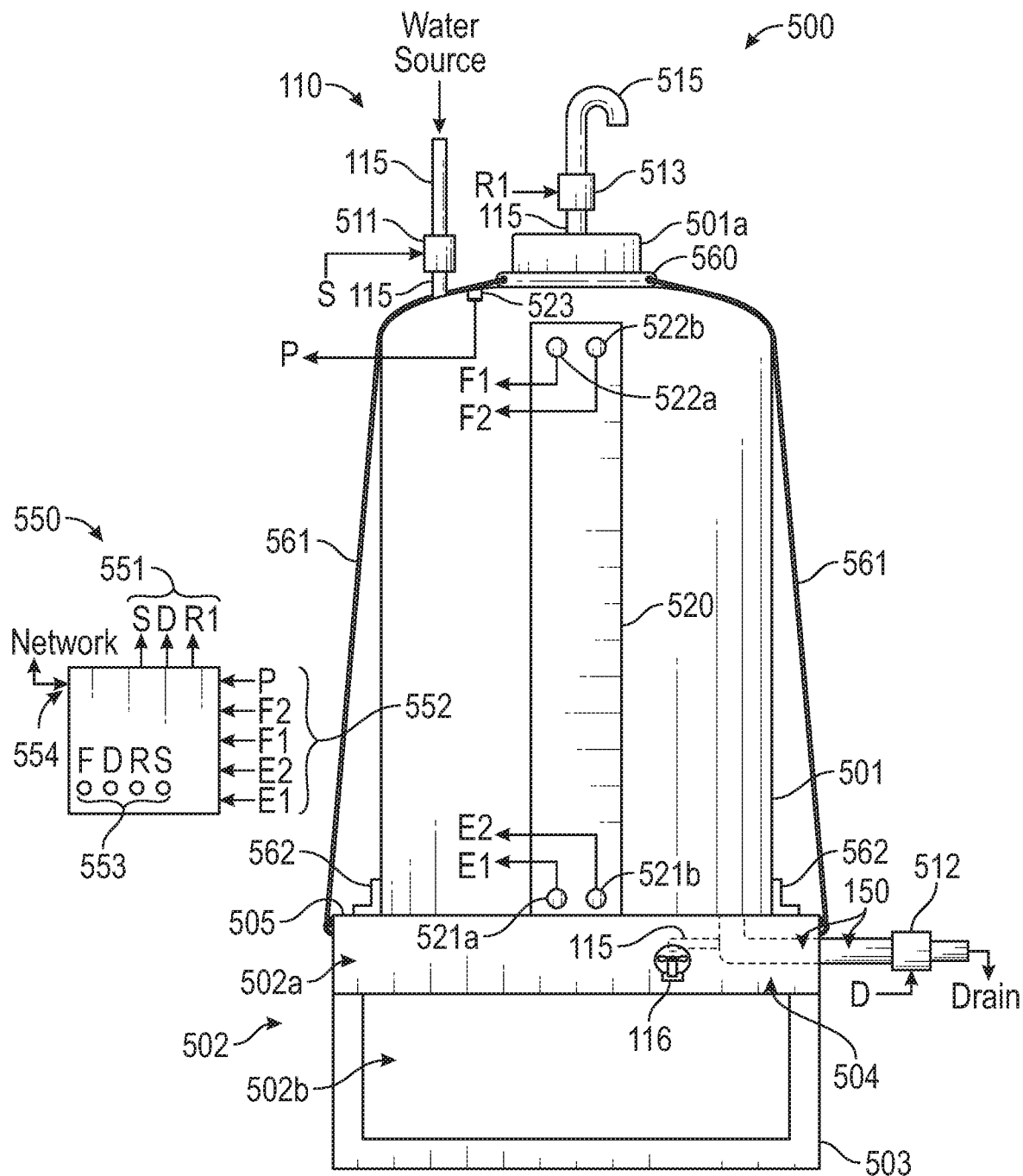
FIGS. 5, 5A and 6 each illustrate another embodiment of a water storage system.

FIG. 5 illustrates a water storage system 500 that is configured in accordance with one or more embodiments of the present invention. Water storage system 500 includes similar components as referenced above as represented by the use of similar reference numbers.

Water storage system 500 includes a single tank 501 that is supported by a platform 502. Platform 502 includes a frame 503 which defines an enclosed area 502a above an open area 502b. In some embodiments, enclosed area 502a can be formed by securing one or more panels 504 to the sides of frame 503 along upper surface 505 on which tank 501 rests. Enclosed area 502a can house (or enclose) outlet 150 and support spigot 116. As shown, spigot 116 can be secured to panel 504 where it will be accessible for obtaining water from tank 501.

Tank 501, which may have a main body forming a generally cylindrical shape, can include a top portion 501a that protrudes upwardly beyond the cylindrical shape of the tank's main body. In some embodiments, top portion 501a may also have a cylindrical shape. A ring 560, which could be formed of metal, can be positioned around top portion 501a and may rest on top of the main body of tank 501. One or more cables 561 may be secured at one end to ring 560 and at the other end to frame 503. Cables 561 may be taut to thereby apply a downward force on tank 501 to hold it against platform 502. In this way, tank 501 can be prevented from tipping over such as during an earthquake. One or more retainers 562 could also be secured to upper surface 505 of platform and positioned against tank 501 to thereby prevent tank 501 from sliding horizontally relative to upper surface 505. In some embodiments, retainers 562 may be in the form of angle iron that is positioned on multiple sides of tank 501.

Water storage system 500 represents an embodiment where automatic flow control components are employed. For example, water storage system 500 can employ a supply valve 511 that forms part of inlet 110, a drain valve 512 that forms part of outlet 150 and a relief valve 513 that allows air to vent from tank 501 via venting pipe 515 that may be routed to an appropriate location. As an example only, each of valves 511-513 could be an electrically actuated ball valve. In the depicted embodiment, inlet 110 is connected to the top and towards a side of tank 501, relief valve 513 is connected to top portion 501a via pipe 115 and outlet 150 is connected to the bottom of tank 501 and concealed within enclosed portion 502a of platform 502. Spigot 116 may be connected to outlet 150 via pipe 115.

Water storage system 500 also includes a number of sensors including water level sensors 521a, 521b, 522a and 522b (which may be optical sensors in some embodiments) and pressure sensor 523. Water level sensors 521a and 521b are positioned at the bottom of tank 501 and function to sense when tank 501 is empty. In contrast, water level sensors 522a and 522b are positioned towards the top of tank 501 and function to sense when tank 501 is full. In some embodiments, water storage system 500 may only include water level sensors 521a and 522a. However, by including water level sensors 521b and 522b, redundancy is provided in case one of the sensors fails.

In some embodiments, water level sensors 521a, 521b, 522a and 522b may be housed in a support member 520 that extends along the height of tank 501. Support member 520 may be secured to tank 501 and/or platform 502 to ensure that the water level sensors remain positioned adjacent to tank 501.

Pressure sensor 523 is positioned at the top of tank 501 above water level sensors 522a and 522b and functions to detect when the water level inside tank 501 has risen beyond the level of water level sensors 522a and 522b. In other words, pressure sensor 523 can function as a failsafe to prevent overflowing in the event water level sensors 522a and 522b malfunction.

Water storage system 500 further includes control module 550 having inputs 552 by which control module 550 is electrically connected to water level sensors 521a, 521b, 522a and 522b and pressure sensor 523 and outputs 551 by which control module 550 is electrically connected to supply valve 511, drain valve 512 and relief valve 513. Control module 550 may also include user input components 553 (e.g., buttons) by which a user can control water storage system 500. In some embodiments, user input components 553 may include a fill component (F), a drain component (D), a refresh component (R) and a stop component (S). Control module 550 may also include a network interface 554 (e.g., a wired or wireless interface) by which a user can control/monitor water storage system 500 via a network (e.g., using a browser or mobile application that provides user interface elements similar to user input components 553).

Figure 5A:
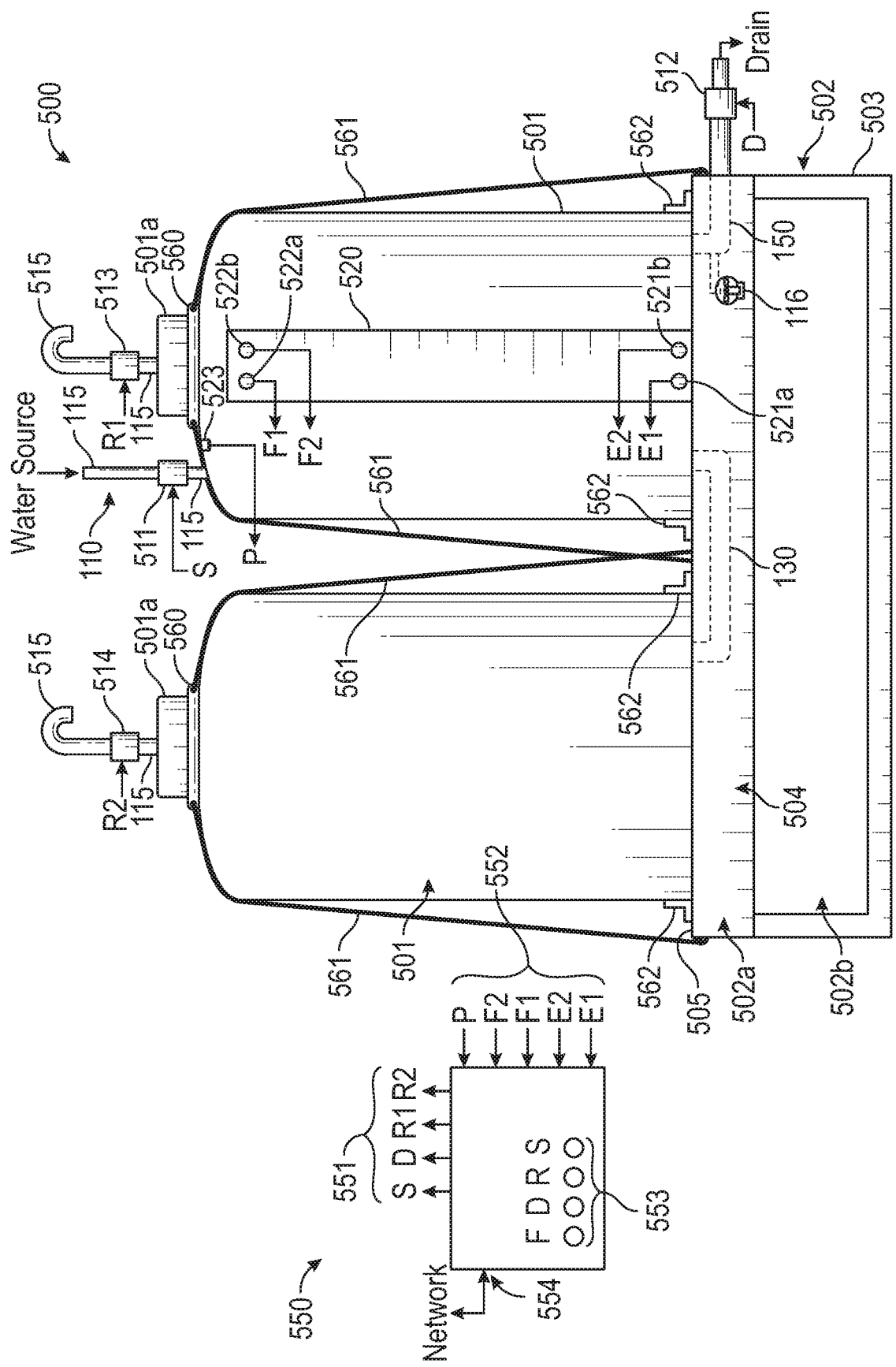

FIG. 5A illustrates water storage system 500 when two tanks 501 are employed. In these multi-tank embodiments, the second tank (and any additional tank) includes a relief valve 514 and is coupled to the first (or adjacent) tank via inter-tank connection 130. Like outlet 150, inter-tank connection 130 may be housed within enclosed area 502a of platform 502. Due to inter-tank connection 130, the water level in the second tank will follow the water level in the first tank. As such, only one of tanks 501 includes water level sensors. Also, in these embodiments, control module 550 can include an additional output for controlling relief valve 514. However, in some embodiments, the same output may be used to control both relief valves 513 and 514.

The functionality that control module 550 performs will now be described. Control module 550 can be configured to perform a fill process, a drain process or a refresh process in response to manual user input (e.g., via user input components 553), network-based user input (e.g., wired or wireless communications received via network interface 554), a programmed schedule, etc. Regardless of how control module 550 is instructed or determines that a particular process should be performed, it can carry out the process as described below.

In response to receiving input that indicates that tank(s) 501 should be filled, control module 550 can evaluate the readings from water level sensor 522a (and possibly water level sensor 522b) to determine whether tank(s) 501 is/are already full. If not, control module 550 can output a control signal to relief valve 513 (and relief valve 514 in multi-tank embodiments) to open the valve. In conjunction with opening relief valve 513/514, control module 550 can also output a control signal to supply valve 511 to open the valve thereby allowing water to flow into tank(s) 501. Control module 550 may also ensure that drain valve 512 is closed and, if not, can output a control signal to close it.

While supply valve 511 remains open, control module 550 can monitor the readings received from water level sensor 522a/522b to determine when tank(s) 501 is/are full. Once control module 550 detects, based on the readings from water level sensor 522a/522b, that tank(s) 501 is/are full, control module 550 can send a control signal to cause supply valve 511 to close and a control signal(s) to cause relief valve 513/514 to close. At this point, control module 550 will have completed the fill process and can await further input.

In response to receiving input that indicates that tank(s) 501 should be emptied, control module 550 can evaluate the readings from water level sensor 521a/521b to determine whether tank(s) 501 is/are already empty. If not, control module 550 can output a control signal to relief valve 513 (and relief valve 514 in multi-tank embodiments) to open the valve. In conjunction with opening relief valve 513/514, control module 550 can also output a control signal to drain valve 512 to open the valve thereby allowing water to flow out from tank(s) 501.

While drain valve 512 remains open, control module 550 can monitor the readings received from water level sensor 521a/521b to determine when tank(s) 501 is/are empty. Once control module 550 detects, based on the readings from water level sensor 521a/521b, that tank(s) 501 is/are empty, control module 550 can send a control signal to cause drain valve 512 to close and a control signal(s) to cause relief valve 513/514 to close. At this point, control module 550 will have completed the empty process and can await further input.

In response to receiving input that indicates that tank(s) 501 should be refreshed, control module 550 can evaluate the readings from water level sensor 521a/521b to determine whether tank(s) 501 is/are already empty. If not, control module 550 can output a control signal to relief valve 513 (and relief valve 514 in multi-tank embodiments) to open the valve. In conjunction with opening relief valve 513/514, control module 550 can also output a control signal to drain valve 512 to open the valve thereby allowing water to flow out from tank(s) 501.

While drain valve 512 remains open, control module 550 can monitor the readings received from water level sensor 521a/521b to determine when tank(s) 501 is/are empty. Once control module 550 detects, based on the readings from water level sensor 521a/521b, that tank(s) 501 is/are empty, control module 550 can send a control signal to cause drain valve 512 to close. Once drain valve 512 is closed, control module 550 can send a control signal to supply valve 511 to open the valve thereby allowing water to flow into tank(s) 501.

While supply valve 511 remains open, control module 550 can monitor the readings received from water level sensor 522a/522b to determine when tank(s) 501 is/are full. Once control module 550 detects, based on the readings from water level sensor 522a/522b, that tank(s) 501 is/are full, control module 550 can send a control signal to cause supply valve 511 to close and a control signal(s) to cause relief valve 513/514 to close. At this point, control module 550 will have completed the refresh process and can await further input.

During any of these processes, if control module 550 receives input indicating that the process should be stopped, control module 550 can immediately cease the process by closing any valve that may be opened. Similarly, during the fill or refresh processes, if control module 550 receives a reading from pressure sensor 523 indicative of tank(s) 501 being overfilled, control module 550 can close supply valve 511 to prevent further filling of tank(s) 501. In some embodiments, if the reading from pressure sensor 523 exceeds a defined threshold, control module 550 may open relief valve 513/514 and/or drain valve 512 to thereby reduce the pressure inside tank(s) 501. As suggested above, in some embodiments, control module 550 may be programmed to perform a process according to a schedule. For example, control module 550 could be programmed to perform the refresh process monthly or at some other interval. In this way, water storage system 500 can consistently store fresh water.

Figure 6:
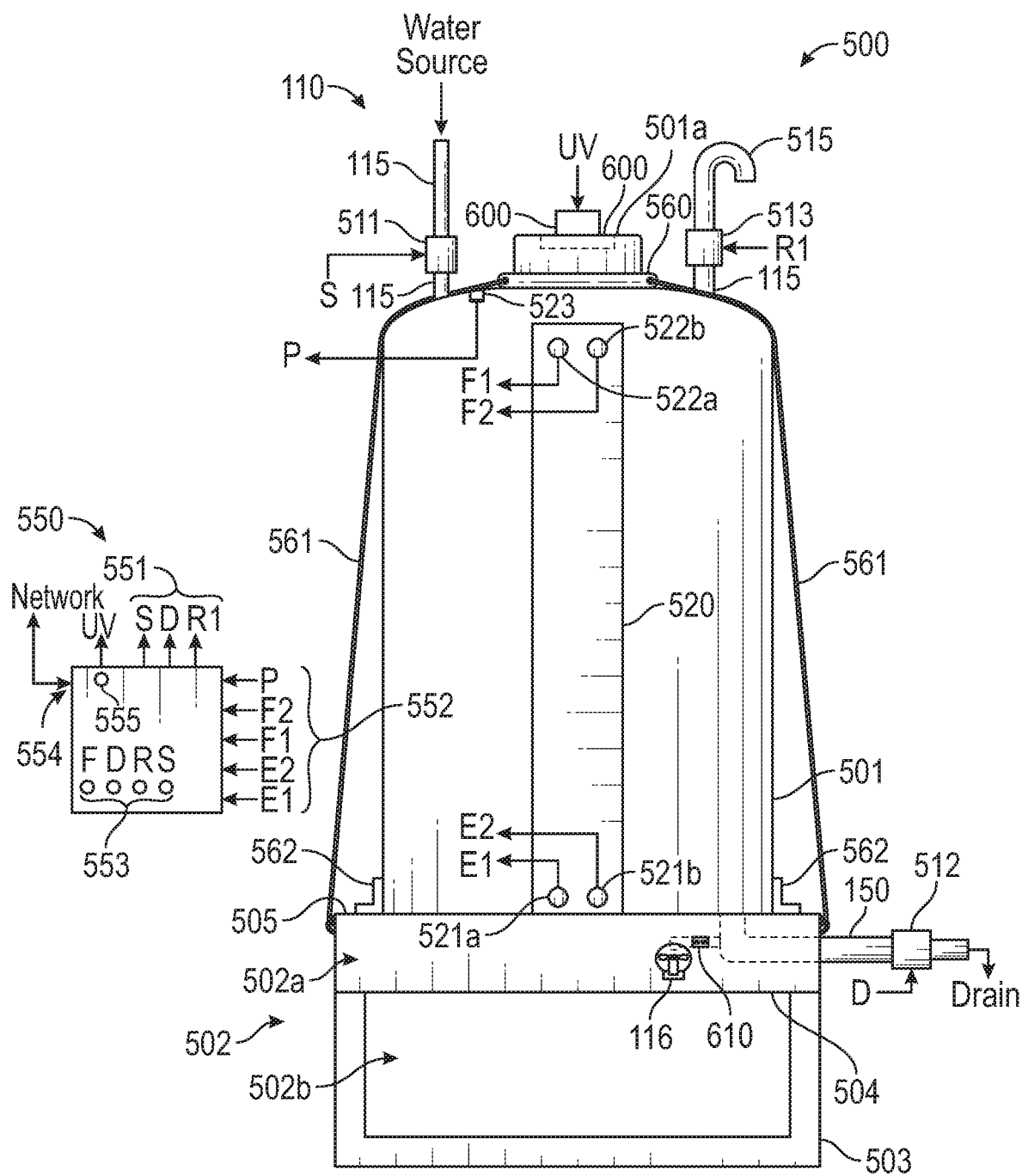

FIG. 6 illustrates additional features that may be employed on water storage system 500. As shown, a UV light unit 600 can be integrated into top portion 501a so that UV light will be transmitted through water contained in tank 501. Although not shown, in multi-tank embodiments, each tank 501 can include a UV light. UV light unit 600 can be integrated such that the source of the UV light (e.g., a bulb) is contained inside tank 501. Because UV light unit 600 is integrated into top portion 501a, it will be isolated from the water while being positioned above the water.

In such embodiments, control module 550 can include a user input component 555 for activating UV light unit 600. For example, when a user provides input to user input component 555, control module 550 can send a control signal to UV light unit 600 to turn on the source of UV light for a duration of time. By delivering UV light to the water in tank(s) 501, the water can be sanitized. Control module 550 can also be configured to activate UV light unit 600 in response to network communications, in accordance with a schedule, in conjunction with another process, etc.

FIG. 6 also illustrates that a filter 610 may be integrated into the fluid pathway to spigot 116. In such embodiments, this fluid pathway (e.g., the pipes containing filter 610) may be replaceable or filter 610 itself may be replaceable. By providing filter 610 in the fluid pathway to spigot 116, water contained in tank(s) 501 can be consumed even if it is/becomes contaminated.

The features of water storage system 500 may equally be integrated into the pod-based embodiments such as water storage system 300. For example, with reference to FIG. 3A, supply valve 511 and drain valve 512 could be used in place of flow control components 314 and relief valve 513 could be used in place of venting component 317. Also, water level sensors 521a and 521b could be positioned on the bottom pod 350 while water level sensors 522a and 522b could be positioned on the top pod 350. Additionally, pressure sensor 523 could be integrated into the top pod 350.

FIGS. 7A-7D illustrate another example of a tank 700 that may be used in the above-described water storage systems (e.g., in place of tank 501) or other water storage systems in accordance with embodiments of the present invention. Tank 700 has a similar structure as tank 501 including a top portion 710 that protrudes upwardly beyond the cylindrical shape of its main body. Top portion 710 may be configured to receive ring 560. A number of fittings 711 may be coupled to or otherwise form part of a top surface of tank 700's main body and may enable the various connections as described above (e.g., supply valve 511, relief valve 513, pressure sensor 523, etc.). A fitting (or opening) 712 may also be coupled to or otherwise form part of top portion 710 and may enable the connection of UV light unit 600. In some embodiments, top portion 710 may be in the form of a removable cap to facilitate access to UV light unit 600. A bulkhead fitting 720 may be positioned at the bottom of tank 700 and may enable the connection of drain valve 512. In multi-tank configurations, a tank 700 could include an additional bulkhead fitting 720 to enable lower inter-tank connection 130.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A water storage system comprising:
a first tank having an inlet and an outlet;
a supply valve that controls flow of water through the inlet;
a drain valve that controls flow of water through the outlet;
a relief valve that vents air from the first tank;
a first water level sensor positioned towards a bottom of the first tank;
a second water level sensor positioned towards a top of the first tank; and
a control module that is connected to the supply valve, the drain valve, the relief valve and the first and second water level sensors, the control module being configured to automatically perform a refresh process by controlling the supply valve, the drain valve and the relief valve based on input from the first and second water level sensors, the refresh process including:
detecting user input that indicates that the refresh process should be performed;
in response to detecting the user input, opening the drain valve;
while the drain valve is open, monitoring readings from the first water level sensor;
when the readings from the first water level sensor indicated that the first tank is empty, closing the drain valve and opening the supply valve;
while the supply valve is open, monitoring readings from the second water level sensor; and when the readings from the second water level sensor indicate that the first tank is full, closing the supply valve.

2. The water storage system of claim 1, wherein detecting user input that indicates that the refresh process should be performed comprises one of:
receiving manual user input at the control module;
receiving network-based user input at the control module; or
following a programmed schedule.

3. The water storage system of claim 1, wherein the refresh process further comprises:
in conjunction with opening the drain valve, opening the relief valve; and
in conjunction with closing the supply valve, closing the relief valve.

4. The water storage system of claim 1, further comprising:
a pressure sensor to which the control module is connected, the pressure sensor monitoring pressure within the first tank;
wherein performing the refresh process further comprises monitoring readings from the pressure sensor while the supply valve is open.

5. The water storage system of claim 1, further comprising:
a platform that supports the first tank, the platform having an enclosed area, the outlet being positioned within the enclosed area.

6. The water storage system of claim 1, further comprising:
at least one additional tank that is fluidly coupled to the first tank by an inter-tank connection; and
for each of the at least one additional tank, a relief valve that vents air from the additional tank.

7. The water storage system of claim 6, further comprising:
a platform that supports the first tank and the at least one additional tank, the platform having an enclosed area, the outlet and the inter-tank connection being positioned within the enclosed area.

8. The water storage system of claim 1, further comprising:
a UV light unit that is integrated into the first tank.

9. The water storage system of claim 1, wherein the first tank includes a top portion and a ring positioned around the top portion, the ring being secured via one or more cables to a platform on which the first tank is placed.

10. The water storage system of claim 6, wherein the drain valve is a first drain valve, further comprising:
an additional drain valve for each of the at least one additional tank.

11. A water storage system comprising:
a first tank having an inlet and an outlet;
a supply valve that controls flow of water through the inlet;
a drain valve that controls flow of water through the outlet;
a relief valve that vents air from the first tank;
more than one first water level sensor positioned towards a bottom of the first tank;
more than one second water level sensor positioned towards a top of the first tank; and
a control module that is connected to the supply valve, the drain valve, the relief valve and the first and second water level sensors, the control module being configured to automatically perform a refresh process by controlling the supply valve, the drain valve and the relief valve based on input from the first and second water level sensors.

12. The water storage system of claim 11, further comprising:
a platform that supports the first tank, the platform having an enclosed area, the outlet being positioned within the enclosed area.

13. The water storage system of claim 11, wherein performing the refresh process comprises:
opening the drain valve;
while the drain valve is open, monitoring readings from the first water level sensor;
when the readings from the first water level sensor indicate that the bottom pod is empty, closing the drain valve and opening the supply valve;
while the supply valve is open, monitoring readings from the second water level sensor; and
when the reading from the second water level sensor indicate that the top pod is full, closing the supply valve.

14. The water storage system of claim 13, wherein the refresh process further comprises:
in conjunction with opening the drain valve, opening the relief valve; and
in conjunction with closing the supply valve, closing the relief valve.

15. The water storage system of claim 13, further comprising:
a pressure sensor to which the control module is connected, the pressure sensor monitoring pressure within the first tank;
wherein performing the refresh process further comprises monitoring readings from the pressure sensor while the supply valve is open.

16. A water storage system comprising:
a first tank having an inlet and an outlet;
a supply valve that controls flow of water through the inlet;
a drain valve that controls flow of water through the outlet;
a relief valve that vents air from the first tank;
a first water level sensor positioned towards a bottom of the first tank;
a second water level sensor positioned towards a top of the first tank; and
a control module that is connected to the supply valve, the drain valve, the relief valve and the first and second water level sensors, the control module being configured to perform a fill process, an empty process and a refresh process, the refresh process including:
detecting user input that indicates that the refresh process should be performed;
in response to detecting the user input, opening the drain valve;
while the drain valve is open, monitoring readings from the first water level sensor;
when the readings from the first water level sensor indicated that the first tank is empty, closing the drain valve and opening the supply valve;
while the supply valve is open, monitoring readings from the second water level sensor; and
when the readings from the second water level sensor indicate that the first tank is full, closing the supply valve.

17. The water storage system of claim 16, wherein the control module is configured to perform the fill process by:

opening the supply valve;

while the supply valve is open, monitoring readings from the second water level sensor; and when the reading from the second water level sensor indicate that the first tank is full, closing the supply valve.

18. The water storage system of claim 16, wherein the control module is configured to perform the empty process by:

opening the drain valve;

while the drain valve is open, monitoring readings from the first water level sensor;

when the readings from the first water level sensor indicate that the first tank is empty, closing the drain valve.

19. The water storage system of claim 16, further comprising:

a second tank fluidly connected to the first tank;

wherein the first and second tank each include a relief valve.

20. The water storage system of claim 16, further comprising:

a spigot by which water from the first tank can be dispensed.

* * * * *